(12) United States Patent
Lee et al.

(10) Patent No.: US 8,610,389 B2
(45) Date of Patent: Dec. 17, 2013

(54) SPEED CONTROL APPARATUS FOR THE SWITCHED RELUCTANCE MOTOR

(75) Inventors: Dong Hee Lee, Busan (KR); Jin Woo Ahn, Busan (KR); Geun Min Lim, Busan (KR); Byeong Han Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 169 days.

(21) Appl. No.: 13/340,429

(22) Filed: Dec. 29, 2011

(65) Prior Publication Data

US 2013/0069577 A1 Mar. 21, 2013

(30) Foreign Application Priority Data

Sep. 20, 2011 (KR) .................. 10-2011-0094805

(51) Int. Cl.
*H02P 7/00* (2006.01)
*B62D 5/04* (2006.01)

(52) U.S. Cl.
CPC .................... *B62D 5/0463* (2013.01)
USPC ............ 318/432; 318/811; 318/257; 318/268

(58) Field of Classification Search
CPC ........................................ B62D 5/0463
USPC ......................... 318/811, 257, 268
See application file for complete search history.

(56) References Cited

U.S. PATENT DOCUMENTS 6,339,307 B1 * 1/2002 Andersson et al. ........... 318/701

FOREIGN PATENT DOCUMENTS

JP 2004-364498 12/2004

OTHER PUBLICATIONS

Office Action for related KR App. No. 10-2011-0094805 dated Sep. 21, 2012 and its English summary.
Lim, G.-M., et al., "Using the flux observer for sensorless SRM parameter error correction method", In "Proceedings of the Korean Institute of Electrical Engineers Summer Annual Conference, Jul. 20-22, 2011", pp. 850-851, and an English translation thereof.

* cited by examiner

*Primary Examiner* — Bentsu Ro
*Assistant Examiner* — David Luo
(74) *Attorney, Agent, or Firm* — Ladas & Parry, LLP

(57) ABSTRACT

Disclosed here is a speed control apparatus for a switched reluctance motor (SRM) including: a current control unit generating command currents for each period; a driving unit generating a pulse width modulation (PWM) signal to allow a voltage to be applied to the SRM; a magnetic flux error calculating unit calculating a magnetic flux error; a rotor position estimating unit calculating an estimation position using the magnetic flux error to output the estimation position to the magnetic flux error calculating unit; and a mode change-over unit allowing a command position corresponding to a command speed to be input to the magnetic flux error calculating unit.

7 Claims, 6 Drawing Sheets

SPEED CONTROL APPARATUS FOR THE SWITCHED RELUCTANCE MOTOR

CROSS REFERENCE TO RELATED APPLICATION

This application claims the benefit of Korean Patent Application No. 10-2011-0094805, filed on Sep. 20, 2011, entitled "Speed Control Apparatus for the Switched Reluctance Motor", which is hereby incorporated by reference in its entirety into this application.

BACKGROUND OF THE INVENTION

1. Technical Field

The present invention relates to a speed control apparatus for a switched reluctance motor.

2. Description of the Related Art

In accordance with the development of industries, a high performance and multi-functional electromotive device has been demanded in order to maintain a high cultural life. Therefore, an electric motor having a simpler mechanical structure, a cheaper cost, and more excellent efficient and output characteristics as compared to the existing electric motor has been demanded.

Among currently known electric motors, a switched reluctance motor (SRM) has been widely used in industrial systems and home appliances due to a simple and firm mechanical structure, an excellent traction torque, a low manufacturing cost, and a cheap maintenance cost.

This SRM is cheap due to a simple structure, is robust to an environmental factor, and has a high generation torque per unit area. However, it is necessary to detect information on a rotor position in order to control a speed of the SRM in industrial applications.

The reason is that the SRM is driven by a pulse type excitation power and a change in magnetic resistance according to saliency of a rotor and a stator, that is, a reluctance torque, such that it is required to continuously apply a pulse excitation power for each predetermined rotation period of a rotor, unlike a general alternate current (AC) electric motor obtaining rotational force by a rotor system.

As the prior art for detecting a rotor position according to this demand, there is a method using a sensor such as an encoder, a resolver, or the like, as disclosed in Japanese Patent Laid-Open No. 2004-364498, or the like. However, it is difficult to use this prior art in a poor environment in which a temperature rises or a large amount of vibration occurs since the used encoder, resolver, or the like, is sensitive to environmental factors such as temperature, vibration, and the like. In addition, this prior art causes an increase in cost due to occurrence of an additional cost.

Therefore, in order to solve this problem, an SRM control method using a sensorless algorithm has been developed.

As the prior art associated with the SRM control method using a sensorless algorithm, there is a sensorless scheme of the SRM using a magnetic flux. In this scheme, a magnetic flux of the phase winding calculated in consideration of a voltage applied to a phase winding, a current flowing in the phase winding, and a resistance value of the phase winding has been used.

However, this prior art may not detect a rotor position in a stop state and has low estimation precision in a low speed period.

In addition, according to the prior art, the phase winding voltage, current, and resistance considered at the time of calculation of the magnetic flux include an error, (particularly, due to a variation in a voltage drop and a variation in the phase winding resistance according to a change in a temperature of a switching device), such that an error continuously occurs in an estimation position.

As a result, due to this error in the estimation position, sensorless performance of the SRM is significantly deteriorated, and when the error is continuously increased, the SRM may also not be operated normally.

SUMMARY OF THE INVENTION

The present has been made in an effort to provide a speed control apparatus for a switched reluctance motor capable of raising estimation precision by using a command position according to a command speed in a transition period from initial driving to a sensorless control period.

Further, the present invention has been made in an effort to provide a speed control apparatus for a switched reluctance motor capable of being stably operated with respect to a change in a driving environment of the switched reluctance motor and a change in a driving circuit thereof by compensating for a rotor position estimated from information on a magnetic flux of the switched reluctance motor using an inflection point of inductance generated by magnetic characteristics.

According to a preferred embodiment of the present invention, there is provided a speed control apparatus for a switched reluctance motor (SRM) including: a current control unit generating a command current corresponding to a deviation between a command speed and an estimation speed of a rotor in a sensorless control period and generating a command current corresponding to a magnetic flux error in an open-loop control period; a driving unit calculating a period in which a voltage is applied to each phase of the SRM using the command current output from the current control unit and a rotor estimation position and generating a pulse width modulation (PWM) signal to allow the voltage to be applied to the SRM; a magnetic flux error calculating unit receiving a command position according to the command speed and a detected voltage and current of the SRM to calculate the magnetic flux error in the open-loop control period and receiving the estimation position and the detected voltage and current of the SRM to calculate the magnetic flux error in the sensorless control period; a rotor position estimating unit receiving the magnetic flux error from the magnetic flux error calculating unit and calculating the estimation speed of the rotor using the received magnetic flux error to output the calculated estimation speed to the current control unit and calculating the estimation position using the received magnetic flux error to output the calculated estimation position to the magnetic flux error calculating unit; and a mode changeover unit allowing a command current corresponding to the magnetic flux error to be transferred from the current control unit to the driving unit and allowing the estimation position output from the rotor position estimating unit to be input to the magnetic flux error calculating unit in the open-loop control period according to a speed of the SRM and allowing a command current corresponding to the deviation between the command speed and the estimation speed of the rotor to be transferred from the current control unit to the driving unit and allowing a command position corresponding to the command speed to be input to the magnetic flux error calculating unit in the sensorless control period.

The current control unit may include: a speed control unit generating a command current corresponding to the deviation between the command speed and the estimation speed of the rotor in the sensorless control period; and a current command unit generating a command current corresponding to the magnetic flux error in the open-loop control period.

The driving unit may include: a control unit receiving the command current and the rotor estimation position to calculate a voltage application period according to rotor positions of each phase so that the command current is applied to the SRM, thereby generating and outputting a switching signal according to the period; a PWM signal generating unit receiving the switching signal output from the control unit to generate the PWM signal; and a converter unit variably switching excitation states of each phase of a multi-phase stator using the PWM signal output from the PWM signal generating unit and a converter reference voltage, thereby generating a rotational torque.

The magnetic flux error calculating unit may include: a magnetic flux estimating unit receiving the command position according to the command speed and the detected current of the SRM to calculate and output an actual magnetic flux in the open-loop control period and receives the estimation position and the detected current of the SRM to calculate and output an actual magnetic flux in the sensorless control period; and a magnetic flux data unit calculating and outputting an estimation magnetic flux using the detected voltage and current of the SRM.

The speed control apparatus for a switched reluctance motor may further include an inductance inflection point detecting unit detecting an inductance inflection point using the detected current of the SRM and correcting the magnetic flux error output from the magnetic flux error calculating unit using a deviation between a rotor position estimated from the detected inductance inflection point and the estimation position estimated from the rotor position estimating unit in an area in which a torque is not generated.

The inductance inflection point detecting unit may include: a correction position estimating unit detecting the inductance inflection point of the SRM using the detected current of the SRM to calculate and output the rotor estimation position; a magnetic flux error compensating unit outputting a position error in the rotor estimation position through the rotor position estimating unit and the rotor estimation position through the inductance inflection point by correction position estimating unit; and a rotor estimation position compensating unit calculating a compensation value for an estimation magnetic flux using the position error calculated by the magnetic flux error compensating unit to compensate for the magnetic flux error calculated in the magnetic flux error calculating unit.

The mode change-over unit may include: a change-over switch allowing the command current to be input to the driving unit and allowing the command position to be input to the magnetic flux estimating unit when an open-loop switching control signal is input and allowing the command current to be input to the driving unit and the estimation position output from the rotor position estimating unit to be input to the magnetic flux estimating unit when a sensorless switching control signal is input; and an operation mode determining unit outputting the open-loop switching control signal to the change-over switch before a rotor speed of the SRM reaches a maximum speed in a hysteresis band and outputting the sensorless switching control signal to the change-over switch when the rotor speed of the SRM reaches the maximum speed in the hysteresis band.

DESCRIPTION OF THE PREFERRED EMBODIMENTS

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

Figure 1:
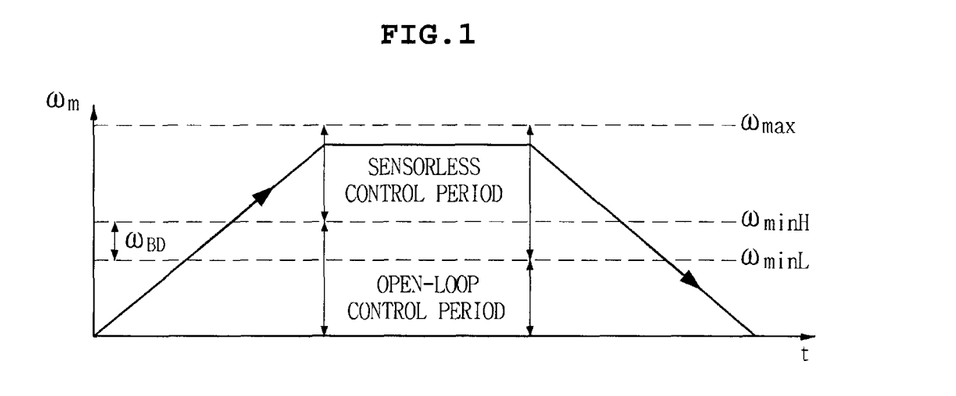
FIG. 1 is a view describing an open-loop control period and a sensorless control period according to a rotor speed in the present invention.

FIG. 1 is a view describing an open-loop control period and a sensorless control period according to a rotor speed in the present invention.

Referring to FIG. 1, in the present invention, the open-loop control period according to the rotor speed $\omega_m$ includes a period from initial driving to a point at which the rotor speed becomes a maximum speed $\omega_{minH}$ in a hysteresis band period $\omega_{BD}$ and a period from a point at which the rotor speed becomes a minimum speed $\omega_{minL}$ in the hysteresis band period $\omega_{BD}$ to a point at which the rotor stops.

In addition, the sensorless control period is a period from a point at which the rotor speed becomes the maximum speed $\omega_{minH}$ in the hysteresis band period $\omega_{BD}$ to the point at which the rotor speed becomes the minimum speed $\omega_{minL}$ in the hysteresis band period $\omega_{BD}$ through a point at which the rotor speed becomes a maximum speed $\omega_{max}$.

The present invention is implemented so that a speed is controlled using an estimation position in the sensorless control period and using a command position according to a command speed in the open-loop control period.

Figure 2:
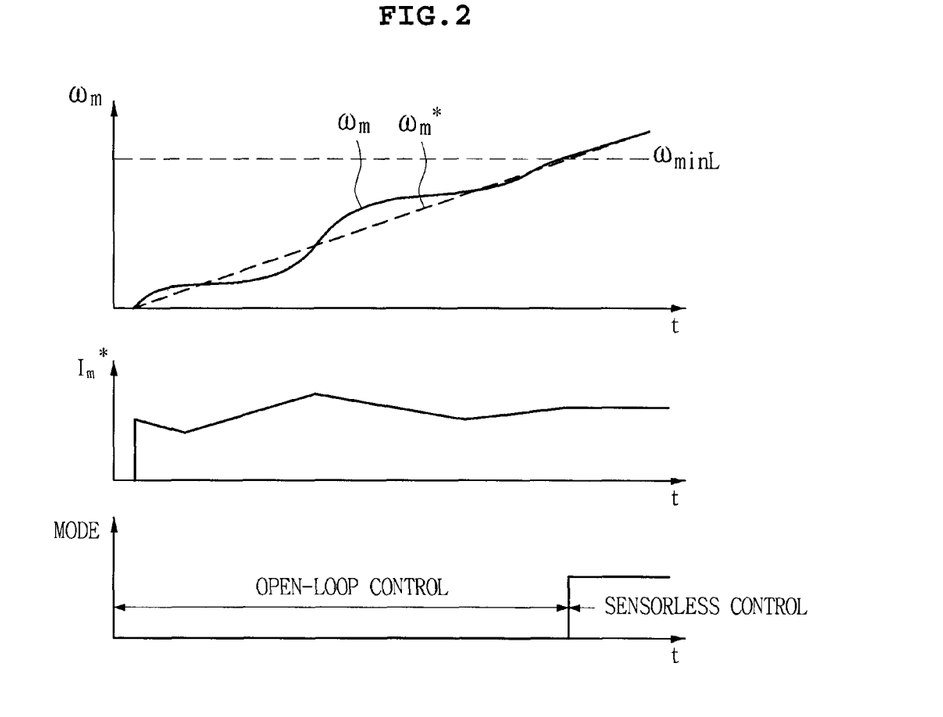
FIG. 2 is a view showing a driving scheme for each control period in the present invention.

FIG. 2 is a view showing a driving scheme for each control period in the present invention.

Referring to FIG. 2, in the present invention, a switched reluctance motor (SRM) is driven using a rated current as a command current $I_m^*$ on the assumption that a load is a rated load at the time of initial driving. Then, the command current is controlled to be continuously varied according to a magnetic flux error through open-loop control, such that a speed $\omega_m$ of the SRM conforms to a command speed $\omega_m^*$. When the speed $\omega_m$ of the SRM rises above a predetermined speed $\omega_{minL}$ at which sensorless control may be performed, the SRM is changed over into a sensorless control operation.

Figure 3:
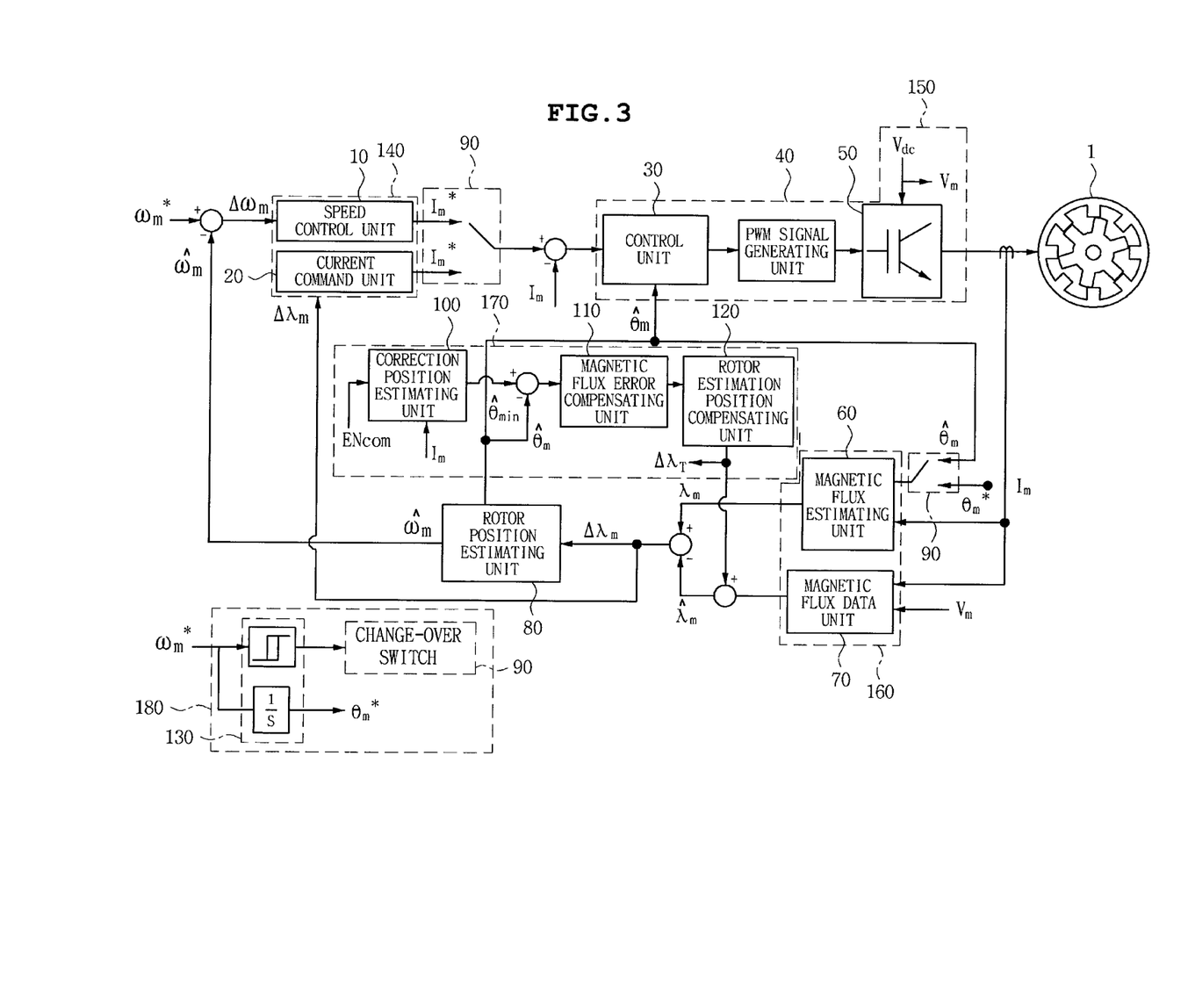
FIG. 3 is a configuration view of a speed control apparatus for a switched reluctance motor according to a first preferred embodiment of the present invention.

FIG. 3 is a configuration view of a speed control apparatus for a switched reluctance motor according to a first preferred embodiment of the present invention.

Referring to FIG. 3, the speed control apparatus for a switched reluctance motor according to the first preferred embodiment of the present invention is configured to include a speed control unit 10, a current command unit 20, a control unit 30, a pulse width modulation (PWM) signal generating unit 40, a converter unit 50, a magnetic flux estimating unit 60, a magnetic flux data unit 70, a rotor position estimating unit 80, a change-over switch 90, a correction position estimating unit 100, a magnetic flux error compensating unit 110, a rotor estimation position compensating unit 120, and an operation mode determining unit 130.

Here, the speed control unit 10 and the current command unit 20 configure a current control unit 140. The current control unit 140 as described above generates a command current $I_m^*$ corresponding to a deviation between a command speed $\omega_m^*$ and an estimation speed $\omega_m^\wedge$ of a rotor in the sensorless control period and generates a command current $I_m^*$ corresponding to a magnetic flux error $\Delta\lambda_m$ in the open-loop control period.

In addition, the control unit 30, the PWM signal generating unit 40, and the converter unit 50 configure a driving unit 150. The driving unit 150 configured as described above calculates a period in which a voltage is applied to each phase of the SRM 1 using a command current and a rotor estimation position and generates a PWM signal to allow the voltage to be applied to the SRM 1 through the converter unit 50.

Next, the magnetic flux estimating unit 60 and the magnetic flux data unit 70 configure a magnetic flux error calculating unit 160. The magnetic flux error calculating unit 160 configured as described above receives a command position according to the command speed and a detected voltage and current of the SRM 1 to calculate a magnetic flux error $\Delta\lambda_m$ in the open-loop control period and receives the estimation position and the detected voltage and current of the SRM 1 to calculate a magnetic flux error $\Delta\lambda_m$ in the sensorless control period.

In addition, the correction position estimating unit 100, the magnetic flux error compensating unit 110, and the rotor estimation position compensating unit 120 configure an inductance inflection point detecting unit 170. The inductance inflection point detecting unit 170 configured as described above detects an inductance inflection point using the detected current of the SRM 1 and corrects a magnetic flux error using a deviation between a rotor position $$\theta_{min}^\wedge$$

estimated from the detected inductance inflection point and an estimation position $\theta_m^\wedge$ estimated from the rotor position estimating unit 80 in an area in which a torque is not generated.

Further, the change-over switch 90 and the operation mode determining unit 130 configure a mode change-over unit 180. The mode change-over unit 180 configured as described above allows a command current corresponding to the magnetic flux error to be transferred from the current control unit 140 to the driving unit 150 and allows the estimation position output from the rotor position estimating unit 80 to be input to the magnetic flux error calculating unit 160 in the open-loop control period according to a speed $\omega_m$ (which is substantially an estimation speed $\omega_m^\wedge$ of the rotor) of the SRM 1, and allows a command current corresponding to the deviation between the command speed $\omega_m^*$ and the estimation speed $\omega_m^\wedge$ of the rotor to be transferred from the current control unit 140 to the driving unit 150 and allows a command position corresponding to the command speed to be input to the magnetic flux error calculating unit 160 in the sensorless control period.

The speed control unit 10 of the speed control apparatus for a switched reluctance motor according to the first preferred embodiment of the present invention configured as described above generates a command current corresponding to a deviation between the command speed $\omega_m^*$ and the estimation speed $\omega_m^\wedge$ of the rotor in the sensorless control period.

In addition, the current command unit 20 generates a command current corresponding to the magnetic flux error $\Delta\lambda_m$ in the initial driving and the open-loop control period.

Further, the control unit 30 receives the command current and the rotor estimation position to calculate a voltage application period according to rotor positions of each phase so that the command current may be sufficiently applied to the SRM 1, such that the converter unit 50 may generate and output a switching signal allowing a voltage to be applied to each phase.

In addition, the PWM signal generating unit 40 receives the switching signal output from the control unit 30 through a processor to generate a PWM signal capable of actually driving the converter unit 50.

The converter unit 50 variably switches excitation states of each phase of a multi-phase stator using the PWM signal output from the PWM signal generating unit 40 and a converter reference voltage, thereby generating a rotational torque in a desired direction.

Next, the magnetic flux estimating unit 60 receives the command position according to the command speed and the detected current of the SRM 1 to calculate and output an actual magnetic flux in the open-loop control period, and receives the estimation position and the detected current of the SRM 1 to calculate and output an actual magnetic flux in the sensorless control period.

Further, the magnetic flux data unit 70 calculates and outputs an estimation magnetic flux using the detected voltage and current of the SRM 1.

The rotor position estimating unit 80 estimates and outputs a position and a speed of the rotor using an error between the actual magnetic flux and the estimation magnetic flux of the SRM 1.

Further, the change-over switch 90 allows the command current output from the current command unit 20 to be input to the control unit 30 when an open-loop switching control signal is input from the operation mode determining unit 130, and allows the command current output from the speed control unit 10 to be input to the control unit 30 when a sensorless switching control signal is input from the operation mode determining unit 130.

In addition, the change-over switch 90 allows the command position to be input to the magnetic flux estimating unit 60 when the open-loop switching control signal is input from the operation mode determining unit 130, and allows the estimation position output from the rotor position estimating unit 80 to be input to the magnetic flux estimating unit 60 when the sensorless switching control signal is input from the operation mode determining unit 130.

In addition, the operation mode determining unit 130 outputs the open-loop switching control signal to the change-over switch 90 before the rotor speed $\omega_m$ of the SRM 1 reaches a maximum speed in a hysteresis band, and outputs the sensorless switching control signal to the change-over switch 90 when the rotor speed $\omega_m$ of the SRM 1 reaches the maximum speed in the hysteresis band.

Meanwhile, the correction position estimating unit 100 detects the inductance inflection point of the SRM using the detected current of the SRM 1.

A change in a temperature in a phase winding, or the like, due to continuous driving of the SRM 1 causes a variation in phase winding resistance, which causes an error in calculation of a magnetic flux and an error in the rotor estimation position. Due to the above-mentioned reason, in the present invention, a sensorless control is performed; however, the correction position estimating unit 100 is used in order to compensate for an error in the rotor estimation position by detecting the rotor position without being affected from the outside through a discontinuous inductance inflection point detecting method using magnetic characteristics of the SRM 1 without being affected by a temperature, or the like.

Next, the magnetic flux error compensating unit 110 calculates and outputs the average value of position errors of the rotor estimation positions through the rotor position estimating unit 80 and the rotor estimation positions through the inductance inflection point. Here, the average value of the position errors of the rotor estimation positions, which is a value obtained by detecting inductance inflection points several times to average errors of each rotor estimation position, enables a stable control. Here, a low pass filter is used so that the error value of the estimation position does not include other components.

Further, the rotor estimation position compensating unit 120 calculates and outputs a correction magnetic flux for the estimation magnetic flux using the position error of the rotor estimation position through the rotor position estimating unit 80 and the rotor estimation position through the inductance inflection point that is calculated and output from the magnetic flux error compensating unit 110 and allows the estimation magnetic flux output from the magnetic flux data unit 70 to be corrected using the correction magnetic flux.

An operation of the speed control apparatus for a switched reluctance motor according to the first preferred embodiment of the present invention configured as described above will be described below.

First, at the time of driving in a stop state, a startup algorithm aligning the rotor and the stator of the SRM 1 to each other is performed by applying a current to one phase, and the rotor position estimating unit 80 then detects the rotor estimation position $\theta_m^\wedge$.

Then, when a command speed $\omega_m^*$ is input, the operation mode determining unit 130 outputs an open-loop switching control signal to the change-over switch 90 so that an open-loop control is performed until a rotor speed reaches a predetermined speed at which the sensorless control may be performed as shown in FIG. 1.

Then, the change-over switch 90 allows a command current of the current command unit 20 to pass to the control unit 30 according to a control of the operation mode determining unit 130.

In addition, the change-over switch 90 allows a command position according to a command speed to pass to the magnetic flux estimating unit 60 according to a control of the operation mode determining unit 130.

The command current output from the current command unit 20 as described above becomes a switching signal through the control unit 30, and is converted into a PWM signal through the PWM signal generating unit 40 to be applied to the converter unit 50.

Next, the converter unit 50 receives the PWM signal input from the PWM signal generating unit 40 and a converter reference voltage $V_m$ input from the outside to variably switch excitation states of each phase of a multi-phase stator, thereby generating a rotational torque in a desired direction.

Figure 4:
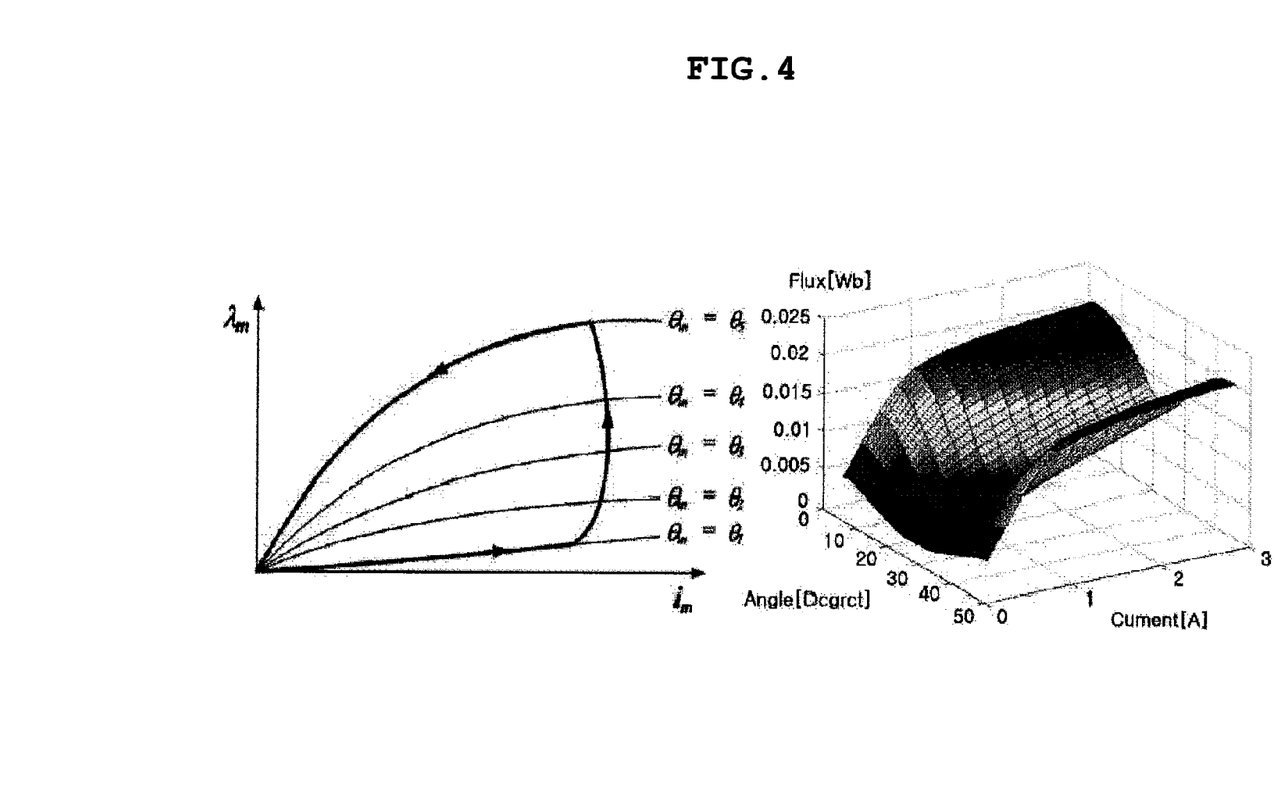
FIG. 4 is a view showing 2-dimensional (2D) and 3-dimensional (3D) look-up tables used in the present invention.

In this situation, the magnetic flux estimating unit 60 calculates and outputs an actual magnetic flux $\lambda_m$ of the SRM 1 using the command position according to the command speed and the detected current detected in a phase of the SRM 1 with reference to a 2-dimensional (2D) or 3-dimensional (3D) look-up table shown in FIG. 4 in which an actual magnetic flux determined by a detected current $I_m$ of the SRM 1 and a position $\theta_m$ (here, a command position) of the rotor is formed in a table form.

Furthermore, the magnetic flux estimating unit 60 may estimate an actual magnetic flux $\lambda_m$ for a position (here, a command position) of the rotor and a current $I_m$ flowing in a phase resistor of the SRM 1 through a separate data interpolation method for interpolating a fine period.

Figure 5:
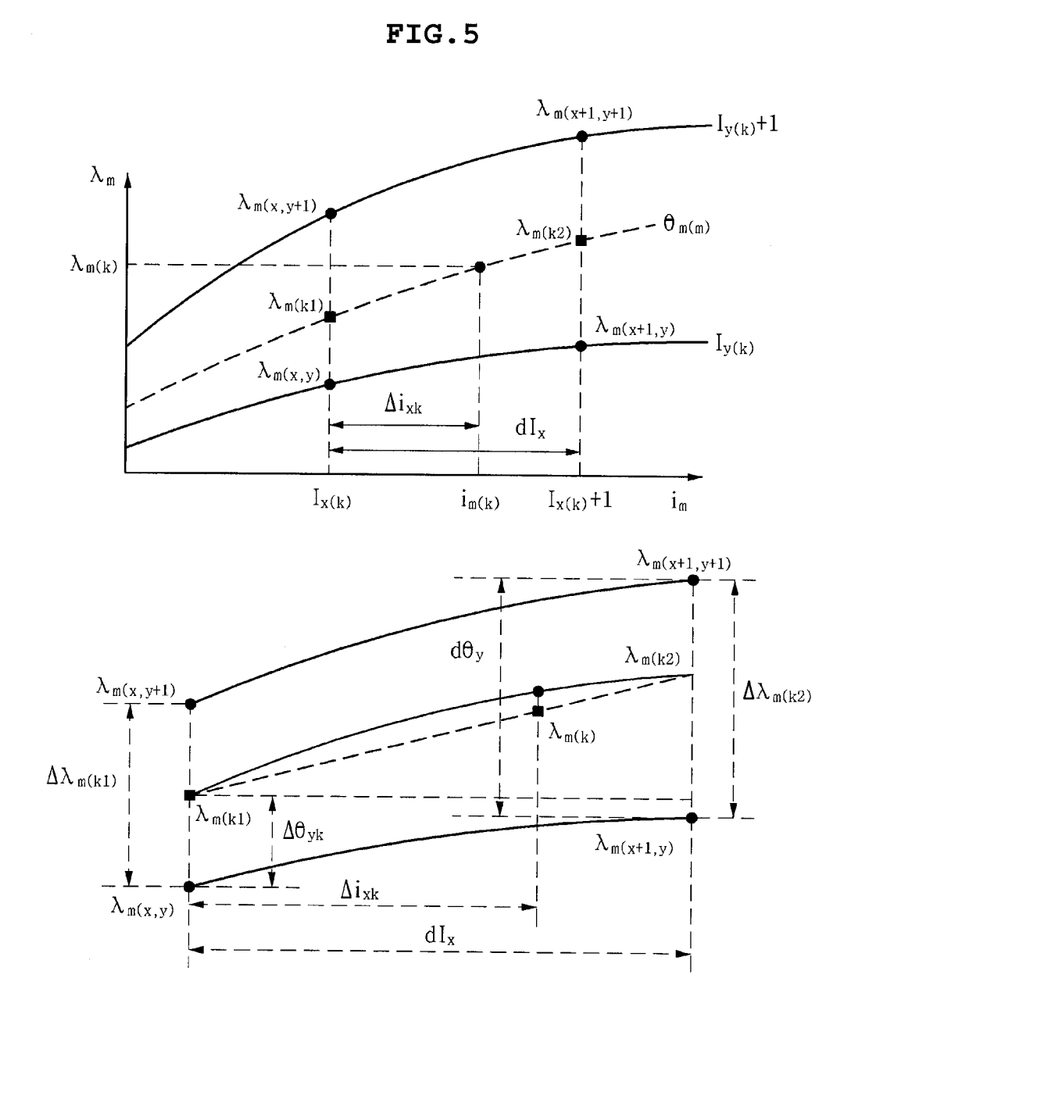
FIG. 5 is a view describing an interpolation method used in the present invention.

In relation to this, FIG. 5 shows a method for estimating data through an interpolation method in a non-linearly configured look-up table through finite element method (FEM) analysis.

The method for estimating data through an interpolation method will be described with reference to FIG. 5.

In FIG. 5, x of $\lambda_{m(x,y)}$ indicates a current, and y thereof indicates a position angle of the rotor. When a data table is made, it is made in predetermine period units of each of x and y, for example, 0.1 A unit of a current and 1 degree unit of an angle. Therefore, interpolation is performed with respect to a current and an angle within the above-mentioned units.

When it is assumed that a current is 1.23 A and an angle is 42.3 degrees, data capable of being calculated by the data table corresponds to (1.2[A], 42[deg]), (1.2[A], 43[deg]), (1.3[A], 42[deg]), and (1.3[A], 43[deg]). Positions of these four points directly correspond to $\lambda_{m(x,y)}, \lambda_{m(x,y+1)}, \lambda_{m(x+1,y)}$, and $\lambda_{m(x+1,y+1)}$ shown in FIG. 5.

Therefore, since $\Delta\theta_{yk}$ on a y axis corresponds to a position on the y axis, it corresponds to an angle difference between four points included in actual data in a current k-th sampling period.

Variables in Equations indicate four points on a graph rather than specific variables.

$$\Delta\lambda_{m(k1)} = \lambda_{m(x,y+1)} - \lambda_{m(x,y)} \quad \text{[Equation 1]}$$

$$\Delta\lambda_{m(k2)} = \lambda_{m(x+1,y+1)} - \lambda_{m(x+1,y)} \quad \text{[Equation 2]}$$

$$\Delta\theta_{yk} = \theta_m - \theta_{m(x)} \quad \text{[Equation 3]}$$

$$\Delta\lambda_{m(k1)} = \lambda_{m(x,y)} - \frac{\Delta\theta_{yk}}{d\theta_y} \cdot \Delta\lambda_{m(k1)^*} \quad \text{[Equation 4]}$$

$$\Delta\lambda_{m(k2)} = \lambda_{m(x+1,y)} - \frac{\Delta\theta_{yk}}{d\theta_y} \cdot \Delta\lambda_{m(k2)^*} \quad \text{[Equation 5]}$$

$$\lambda_{m(k)} = \lambda_{m(x+1,y)} - \frac{\Delta i_{xk}}{dI_x} \cdot (\lambda_{m(k2)} - \lambda_{m(k1)}) \quad \text{[Equation 6]}$$

Meanwhile, the magnetic flux data unit 70 calculates and outputs an estimation magnetic flux $\lambda_m^\wedge$ using the current $I_m$ detected in the SRM 1 and the reference voltage $V_m$ input to the converter 50. The estimation magnetic flux $\lambda_m^\wedge$ is calculated as follows.

$$\hat{\lambda}_{(m)} = \int (V_m - R_s \cdot I_m) \cdot dt \quad \text{[Equation 7]}$$

Where Rs indicates a resistance of the SRM 1.

Here, the reference voltage $V_m$ input to the converter 50 is calculated as follows in consideration of a duty ratio of the PWM signal generating unit 40 switching the converter 50 and a voltage drop component of a switching device.

$$V_m = \frac{t_{on(k)}}{T_s} \cdot V_{dc(k)} - 2 \cdot V_{drop}.$$  [Equation 8]

Where $$\frac{t_{on(k)}}{T_s}$$

indicates a PWM duty ratio, $V_{dc}$ indicates a converter input voltage, and $V_{drop}$ indicates a voltage drop of a device.

The current command unit 20 receives a deviation between the actual magnetic flux $\lambda_m$ of the SRM 1 output from the magnetic flux estimating unit 60 and the estimation magnetic flux $\lambda_m{}^\wedge$ and generates and outputs a command current using an algorithm allowing the estimation magnetic flux to be converged on the actual magnetic flux.

In the case in which the current command unit 20 receives the deviation between the actual magnetic flux $\lambda_m$ and the estimation magnetic flux $\lambda_m{}^\wedge$ of the SRM 1 and generates and outputs the command current so that the estimation magnetic flux is converged on the actual magnetic flux as described above, an output current $I_{mc}{}^*$ is decreased when the rotor speed $\omega_m$ of the SRM 1 is higher than the command speed $\omega_m{}^*$, and an output current $I_{mc}{}^*$ is increased when the rotor speed $\omega_m$ of the SRM 1 is lower than the command speed $\omega_m{}^*$, such that speed hunting and ripple of the SRM 1 are suppressed.

Meanwhile, the operation mode determining unit 130 outputs the sensorless switching control signal to the change-over switch 90 when the rotor speed $\omega_m$ of the SRM 1 reaches the maximum speed in the hysteresis band.

Then, the change-over switch 90 allows the command current of the speed control unit 10 to pass to the control unit 30 and allows the actual position of the rotor output from the rotor position estimating unit 80 to pass to the magnetic flux estimating unit 60, thereby performing change-over from the open-loop control into the sensorless control, according to a control of the operation mode determining unit 130.

When the change-over from the open-loop control into the sensorless control is performed as described above, the speed control unit 10 outputs the command current $I_m{}^*$ according to the deviation between the command speed $\omega_m{}^*$ and the estimation speed $\omega_m{}^\wedge$ of the rotor.

Here, the speed control unit 10 decreases the command current $I_m{}^*$ when the rotor speed $\omega_m{}^\wedge$ is higher than the command speed $\omega_m{}^*$, and increases the command current $I_m{}^*$ when the rotor speed $\omega_m{}^\wedge$ is lower than the command speed $\omega_m{}^*$.

Meanwhile, the control unit 30 calculates voltage application periods according to the rotor positions of each phase using the deviation between the command current $I_m$ and the detected current $I_m$ detected in the SRM 1 and the rotor estimation position $\theta_m{}^\wedge$ so that the command current may be sufficiently applied to the SRM 1, such that the converter unit 50 generates and outputs a switching signal allowing a voltage to be applied to each phase.

In addition, the PWM signal generating unit 40 receives the switching signal from the control unit 30 to generate and output the PWM signal.

The converter unit 50 receives the PWM signal input and the converter reference voltage $V_m$ to variably switch excitation states of each phase of a multi-phase stator thereby generating a rotational torque in a desired direction.

Further, the magnetic flux estimating unit 60 may estimate the actual magnetic flux $\lambda_m$ for the position of the rotor and the current $I_m$ flowing in the phase resistor of the SRM 1 through the separate data interpolation method for interpolating a fine period shown in FIG. 5 as well as the 2D and 3D look-up table shown in FIG. 4 for the relationship between the actual magnetic flux determined by the detected current of the SRM 1 and the position of the rotor (a process of calculating the actual magnetic flux has been described in the open-loop control).

Meanwhile, an error component $\Delta\lambda_m$ of the magnetic flux, which is a deviation between the actual magnetic flux $\lambda_m$ estimated in the magnetic flux estimatin unit 60 and the estimation magnetic flux $\lambda_m{}^\wedge$ estimated in the magnetic flux data unit 70, is input to the rotor position estimating unit 80.

$$\Delta\lambda_m = \lambda_m - \lambda_m{}^\wedge$$  [Equation 9]

The rotor position estimating unit 80 outputs the estimation position $\theta_m{}^\wedge$ and the estimation speed $\omega_m{}^\wedge$ of the rotor using the error component $\Delta\lambda_m$ of the magnetic flux of the SRM 1.

Here, the estimation speed $\omega_m{}^\wedge$ of the rotor of the SRM 1 output from the rotor position estimating unit 80 is compared with the command speed $\omega_m{}^*$, such that a command current $I_{mo}{}^*$ corresponding to an error component $\Delta\omega_m$ between the estimation speed $\omega_m{}^\wedge$ of the rotor and the command speed $\omega_m{}^*$ is output from the speed control unit 10.

Further, the rotor estimation position $\theta_m{}^\wedge$ of the SRM 1 output from the rotor position estimating unit 80 is fed back to the magnetic flux estimating unit 60 to be used to estimate the actual magnetic flux.

Meanwhile, the correction position estimating unit 100 detects the inductance inflection point of the SRM 1 using a gradient of the detected current to estimate the rotor position.

Figure 6:
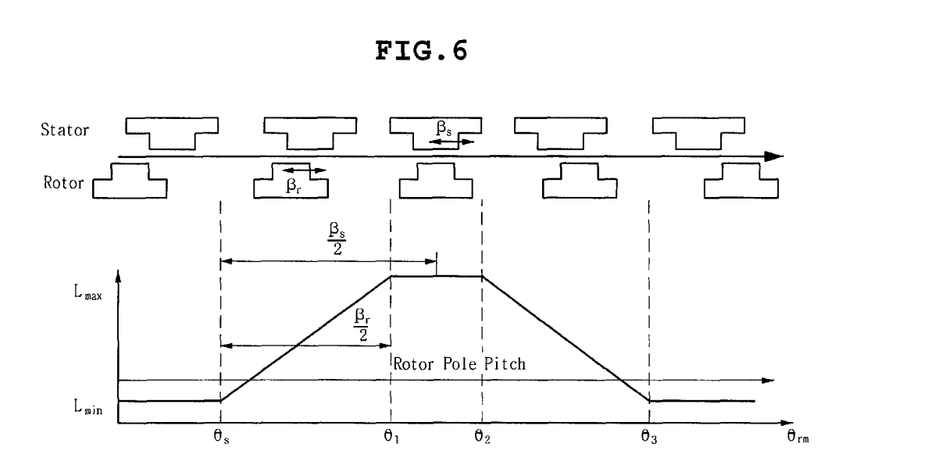
FIG. 6 is a view describing general inductance characteristics according to a rotor position of the switched reluctance motor.

Generally, inductance characteristics according to the rotor position of the SRM 1 may be seen with reference to FIG. 6. An inductance becomes minimum in a period in which the stator and the rotor are not aligned to each other, is increased as the stator and the rotor start to be aligned to each other, and becomes maximum when the stator and the rotor are completely aligned with each other. Thereafter, the inductance is decreased as the stator and the rotor pass by each other and again becomes minimum in the period in which the stator and the rotor are not aligned to each other.

Figure 7:
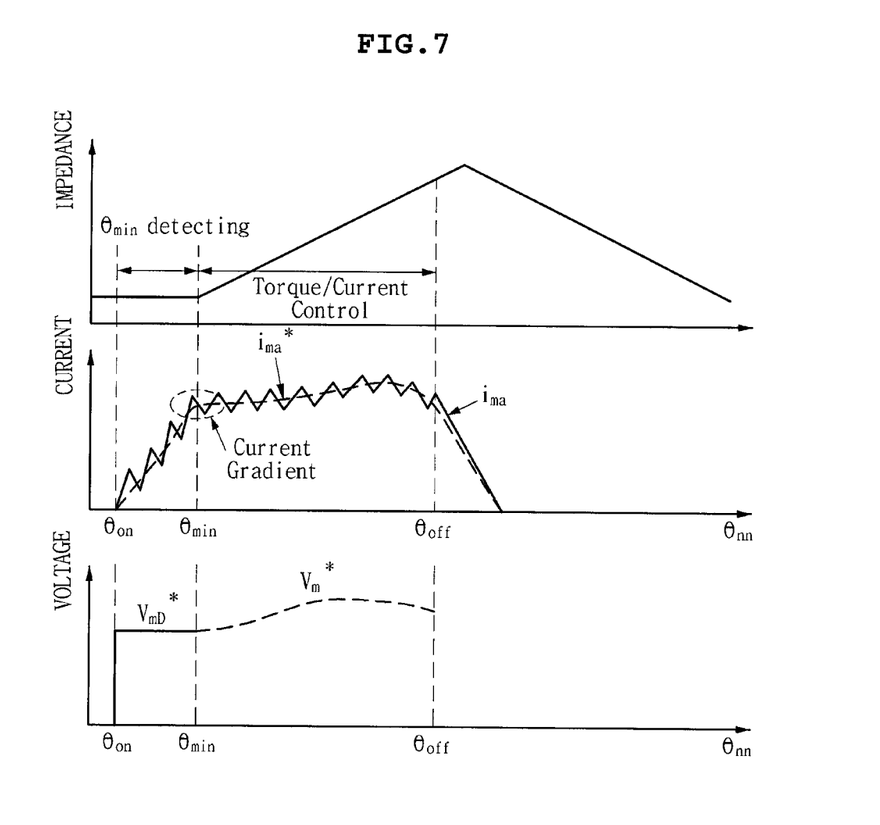
FIG. 7 is a view describing an inductance inflection point and a rotor position applied to the present invention.

When a rated voltage $V_{mD}{}^*$ is applied at the time of the initial driving in order to drive the SRM 1 having the above-mentioned characteristics according to the command current, a current $i_{ma}{}^*$ rises up to a portion up to which the inductance is increased as shown in FIG. 7. The current $i_{ma}{}^*$ is a value obtained by filtering the current $I_{ma}{}^*$ actually flowing in the SRM 1. Thereafter, a gradient of the current rapidly varies at an inflection point up to which the inductance is increased. A point at which the current $i_{ma}{}^*$ rapidly varies is a position of the inductance inflection point. The correction position estimating unit 100 detects the rotor position at this time.

Next, the magnetic flux error compensating unit 110 calculates and outputs the position error in the rotor estimation position $\theta_m{}^\wedge$ through the rotor position estimating unit 70 and the rotor estimation position $\theta_{min}{}^\wedge$ through the detection of the inductance inflection point through correction position estimating unit 100 and includes a low pass filter.

In addition, the rotor estimation position compensating unit 120 calculates and outputs a correction value of the estimation magnetic flux corresponding to the position error in the rotor estimation position through the rotor position estimating unit 70 and the rotor estimation position through the detection of the inductance inflection point through correction position estimating unit 100 that is calculated by the magnetic flux error compensating unit 110.

Here, the rotor estimation position compensating unit 120 calculates and outputs the correction value of the estimation magnetic flux by the following Equation.

$$\Delta\lambda_T = K_{pc} \cdot \Delta\hat{\theta}_{min} + K_{ic} \cdot \Delta\hat{\theta}_{min} \cdot dt \text{ (however, } \Delta\hat{\theta}_{min} = \hat{\theta}_{min} - \hat{\theta}_m\text{)}.$$ [Equation 10]

Where $K_{pc}$ indicates a proportional gain, $K_{ic}$ indicates is a storage gain, $\hat{\theta}_{min}$ indicates the rotor estimation position through the detection of the inductance inflection point, and $\hat{\theta}_m$ indicates the rotor estimation position through the rotor position estimating unit.

The correction value of the estimation magnetic flux output from the rotor estimation position compensating unit 120 as described above is added to the estimation magnetic flux output from the magnetic flux data unit 70, such that the estimation magnetic flux may be corrected.

As described above, according to the preferred embodiment of the present invention, precision may be raised using a command position according to a command speed from initial rotor alignment to a sensorless period.

In addition, according to the preferred embodiment of the present invention, an algorithm compensating for an error due to a phase winding and an external environmental factor is applied, thereby making it possible to improve reliability and precision in a speed control.

Further, according to the preferred embodiment of the present invention, even though a temperature rises due to heat generation owing to the use of a switched reluctance motor in a poor environment, a rotor position is stably estimated even with respect to a change in phase winding resistance of a stator and a variation in voltage drop of a switching device due to the temperature rise, thereby making it possible to implement a reliable sensorless speed control.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A speed control apparatus for a switched reluctance motor (SRM) comprising:
   a current control unit generating a command current corresponding to a deviation between a command speed and an estimation speed of a rotor in a sensorless control period and generating a command current corresponding to a magnetic flux error in an open-loop control period;
   a driving unit calculating a period in which a voltage is applied to each phase of the SRM using the command current output from the current control unit and a rotor estimation position and generating a pulse width modulation (PWM) signal to allow the voltage to be applied to the SRM;
   a magnetic flux error calculating unit receiving a command position according to the command speed and a detected voltage and current of the SRM to calculate the magnetic flux error in the open-loop control period and receiving the estimation position and the detected voltage and current of the SRM to calculate the magnetic flux error in the sensorless control period;
   a rotor position estimating unit receiving the magnetic flux error from the magnetic flux error calculating unit and calculating the estimation speed of the rotor using the received magnetic flux error to output the calculated estimation speed to the current control unit and calculating the estimation position using the received magnetic flux error to output the calculated estimation position to the magnetic flux error calculating unit; and
   a mode change-over unit allowing a command current corresponding to the magnetic flux error to be transferred from the current control unit to the driving unit and allowing the estimation position output from the rotor position estimating unit to be input to the magnetic flux error calculating unit in the open-loop control period according to a speed of the SRM and allowing a command current corresponding to the deviation between the command speed and the estimation speed of the rotor to be transferred from the current control unit to the driving unit and allowing a command position corresponding to the command speed to be input to the magnetic flux error calculating unit in the sensorless control period.

2. The speed control apparatus for a switched reluctance motor as set forth in claim 1, wherein the current control unit includes:
   a speed control unit generating a command current corresponding to the deviation between the command speed and the estimation speed of the rotor in the sensorless control period; and
   a current command unit generating a command current corresponding to the magnetic flux error in the open-loop control period.

3. The speed control apparatus for a switched reluctance motor as set forth in claim 1, wherein the driving unit includes:
   a control unit receiving the command current and the rotor estimation position to calculate a voltage application period according to rotor positions of each phase so that the command current is applied to the SRM, thereby generating and outputting a switching signal according to the period;
   a PWM signal generating unit receiving the switching signal output from the control unit to generate the PWM signal; and
   a converter unit variably switching excitation states of each phase of a multi-phase stator using the PWM signal output from the PWM signal generating unit and a converter reference voltage, thereby generating a rotational torque.

4. The speed control apparatus for a switched reluctance motor as set forth in claim 1, wherein the magnetic flux error calculating unit includes:
   a magnetic flux estimating unit receiving the command position according to the command speed and the detected current of the SRM to calculate and output an actual magnetic flux in the open-loop control period and receives the estimation position and the detected current of the SRM to calculate and output an actual magnetic flux in the sensorless control period; and
   a magnetic flux data unit calculating and outputting an estimation magnetic flux using the detected voltage and current of the SRM.

5. The speed control apparatus for a switched reluctance motor as set forth in claim 1, further comprising an inductance inflection point detecting unit detecting an inductance inflection point using the detected current of the SRM and correcting the magnetic flux error output from the magnetic flux error calculating unit using a deviation between a rotor position estimated from the detected inductance inflection point and the estimation position estimated from the rotor position estimating unit in an area in which a torque is not generated.

6. The speed control apparatus for a switched reluctance motor as set forth in claim 5, wherein the inductance inflection point detecting unit includes:
- a correction position estimating unit detecting the inductance inflection point of the SRM using the detected current of the SRM to calculate and output the rotor estimation position;
- a magnetic flux error compensating unit outputting a position error in the rotor estimation position through the rotor position estimating unit and the rotor estimation position through the inductance inflection point by correction position estimating unit; and
- a rotor estimation position compensating unit calculating a compensation value for an estimation magnetic flux using the position error calculated by the magnetic flux error compensating unit to compensate for the magnetic flux error calculated in the magnetic flux error calculating unit.

7. The speed control apparatus for a switched reluctance motor as set forth in claim 1, wherein the mode change-over unit includes:
- a change-over switch allowing the command current to be input to the driving unit and allowing the command position to be input to the magnetic flux estimating unit when an open-loop switching control signal is input and allowing the command current to be input to the driving unit and the estimation position output from the rotor position estimating unit to be input to the magnetic flux estimating unit when a sensorless switching control signal is input; and
- an operation mode determining unit outputting the open-loop switching control signal to the change-over switch before a rotor speed of the SRM reaches a maximum speed in a hysteresis band and outputting the sensorless switching control signal to the change-over switch when the rotor speed of the SRM reaches the maximum speed in the hysteresis band.

\* \* \* \* \*